Sept. 29, 1959 N. TOFFIN 2,906,078
SWATHING MACHINE
Filed Sept. 2, 1954 11 Sheets-Sheet 1

INVENTOR.

Sept. 29, 1959 N. TOFFIN 2,906,078
SWATHING MACHINE
Filed Sept. 2, 1954 11 Sheets-Sheet 2

INVENTOR.
N. Toffin
BY
G. S. Roxburgh
His Atty

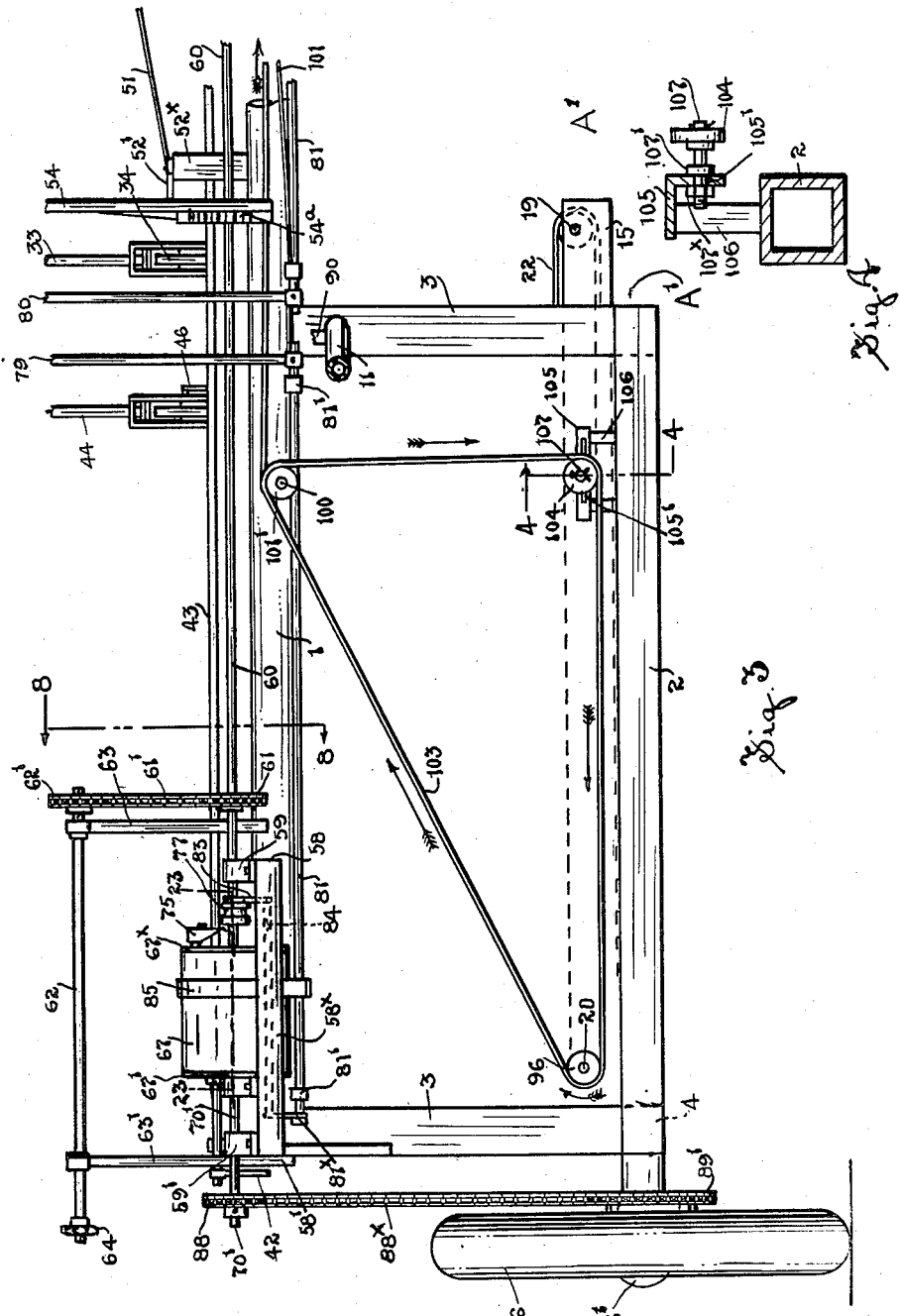

Sept. 29, 1959  N. TOFFIN  2,906,078
SWATHING MACHINE
Filed Sept. 2, 1954  11 Sheets-Sheet 4
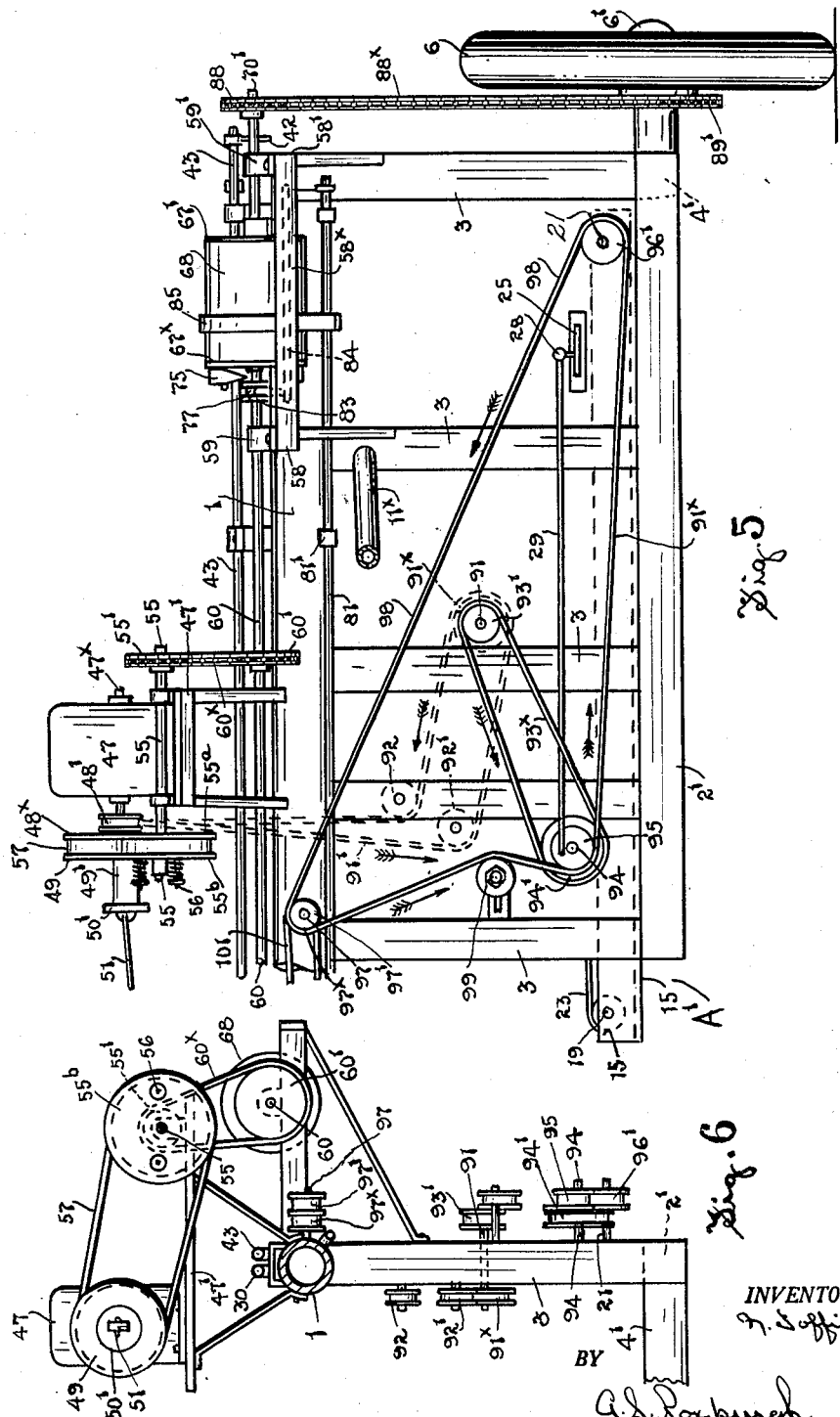

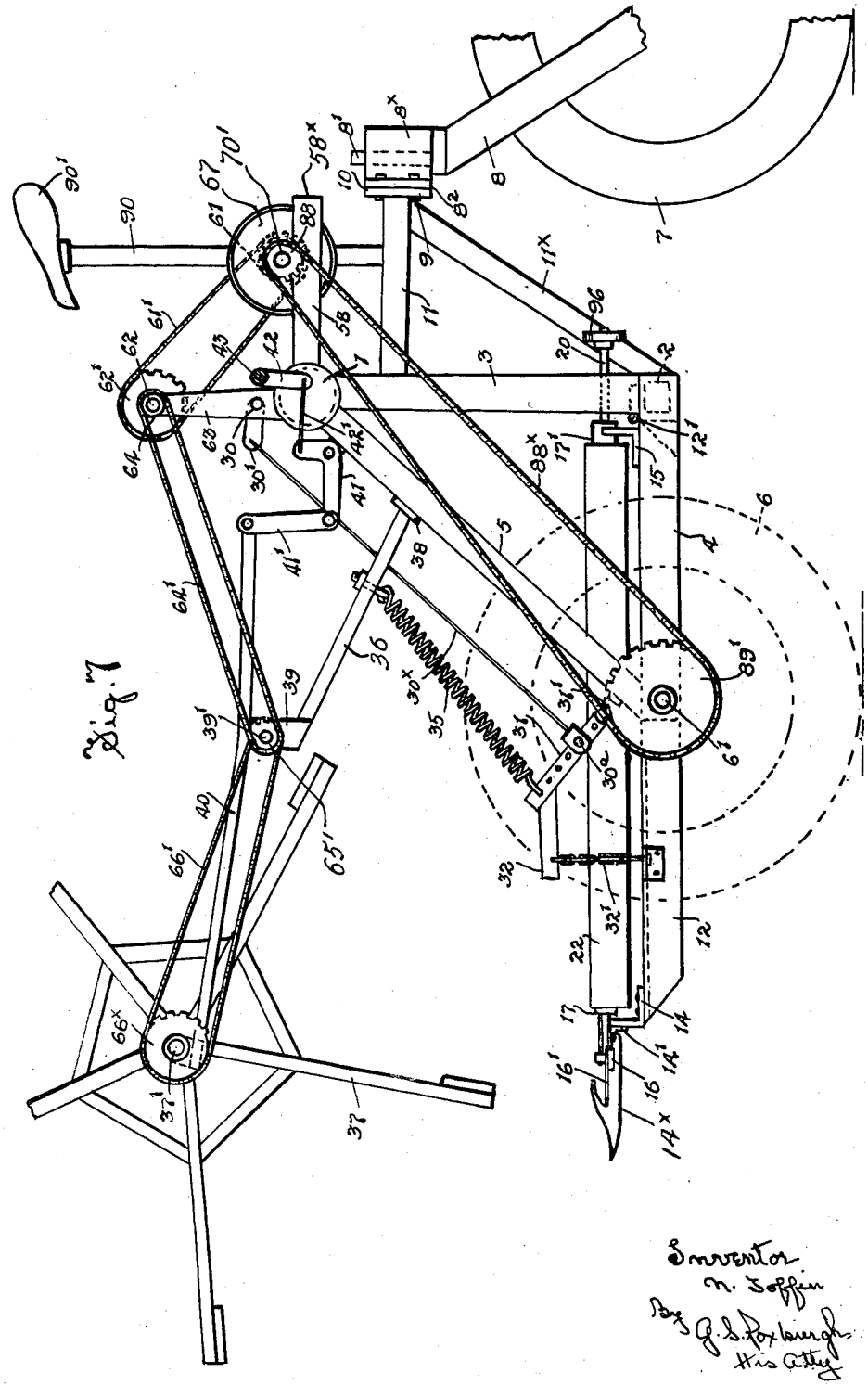

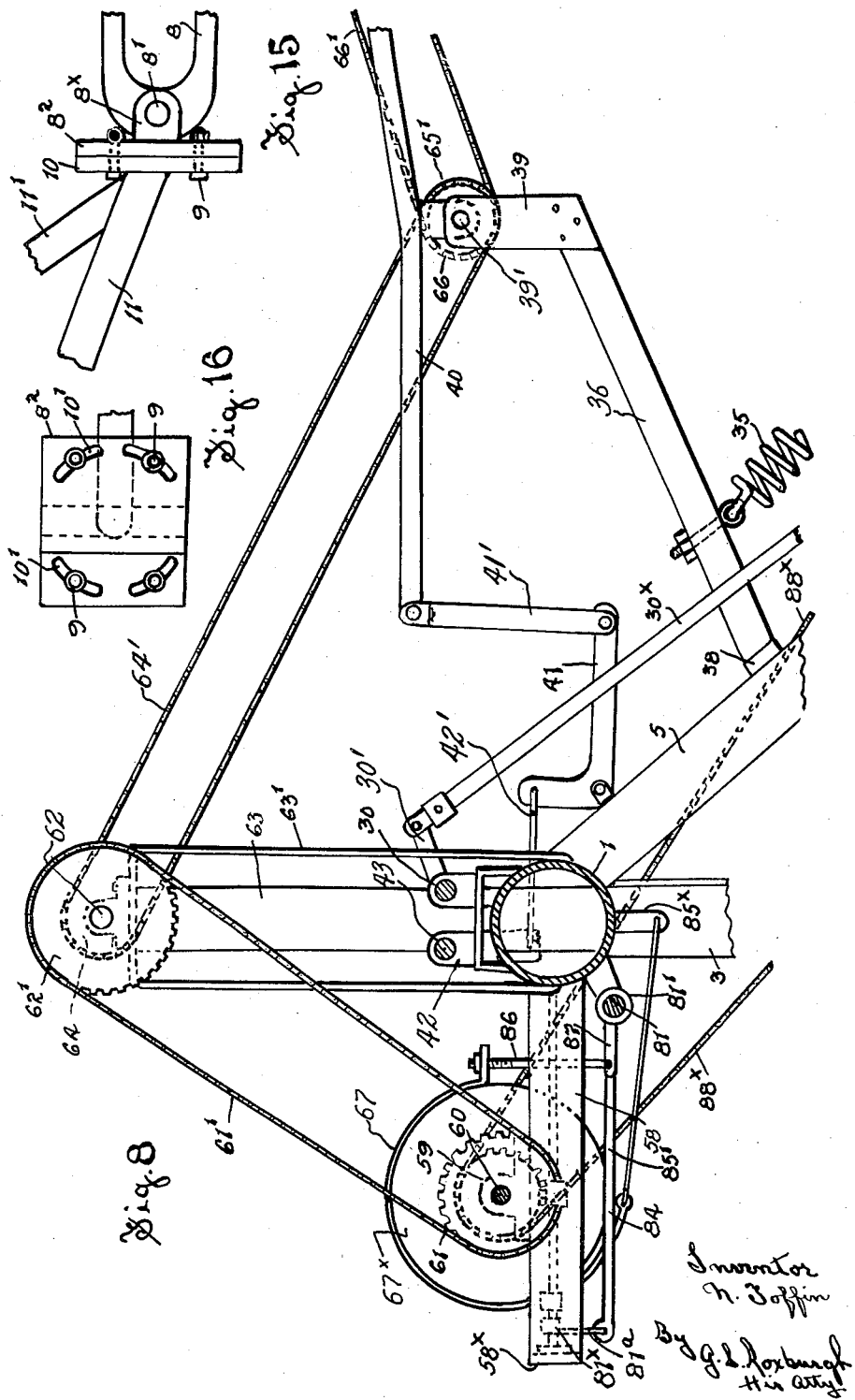

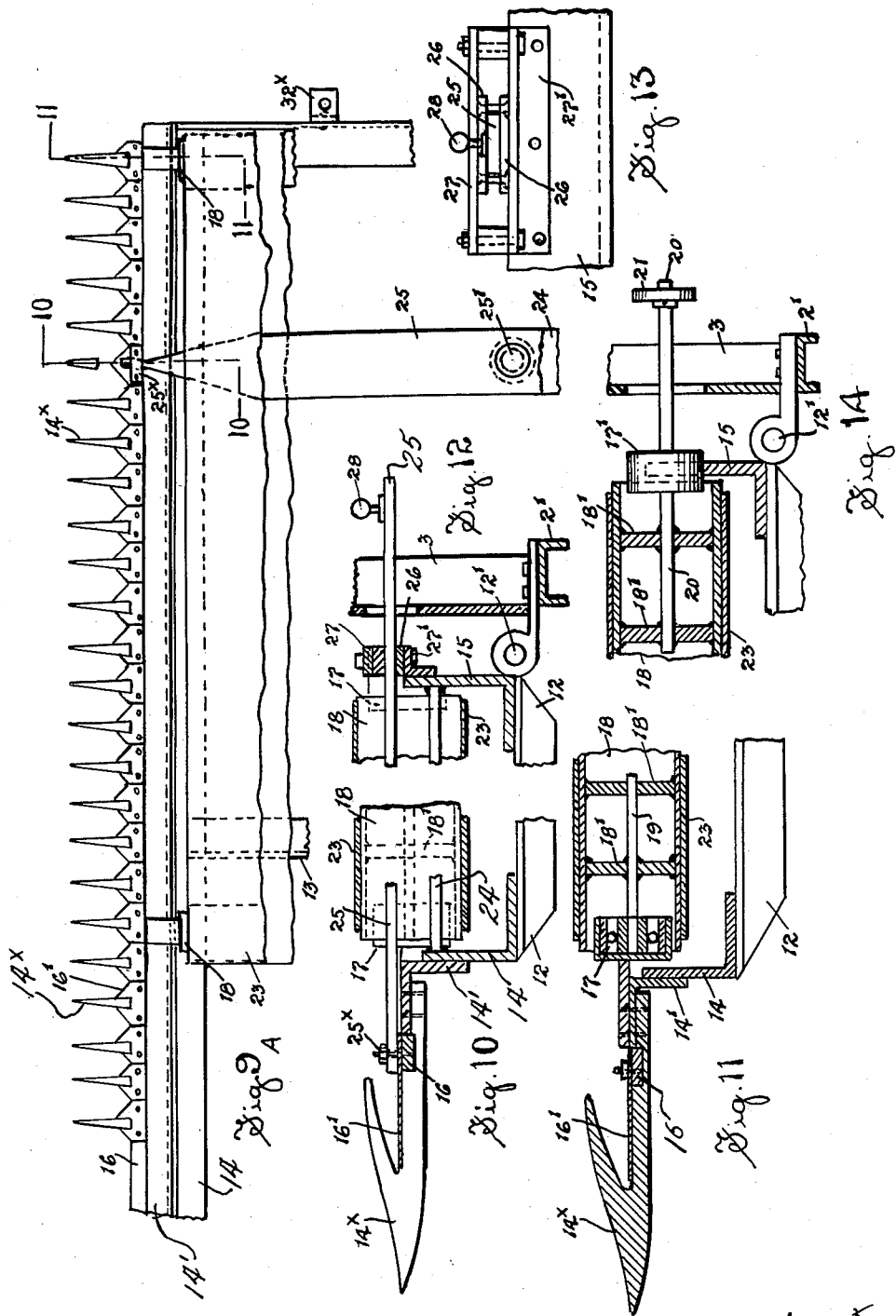

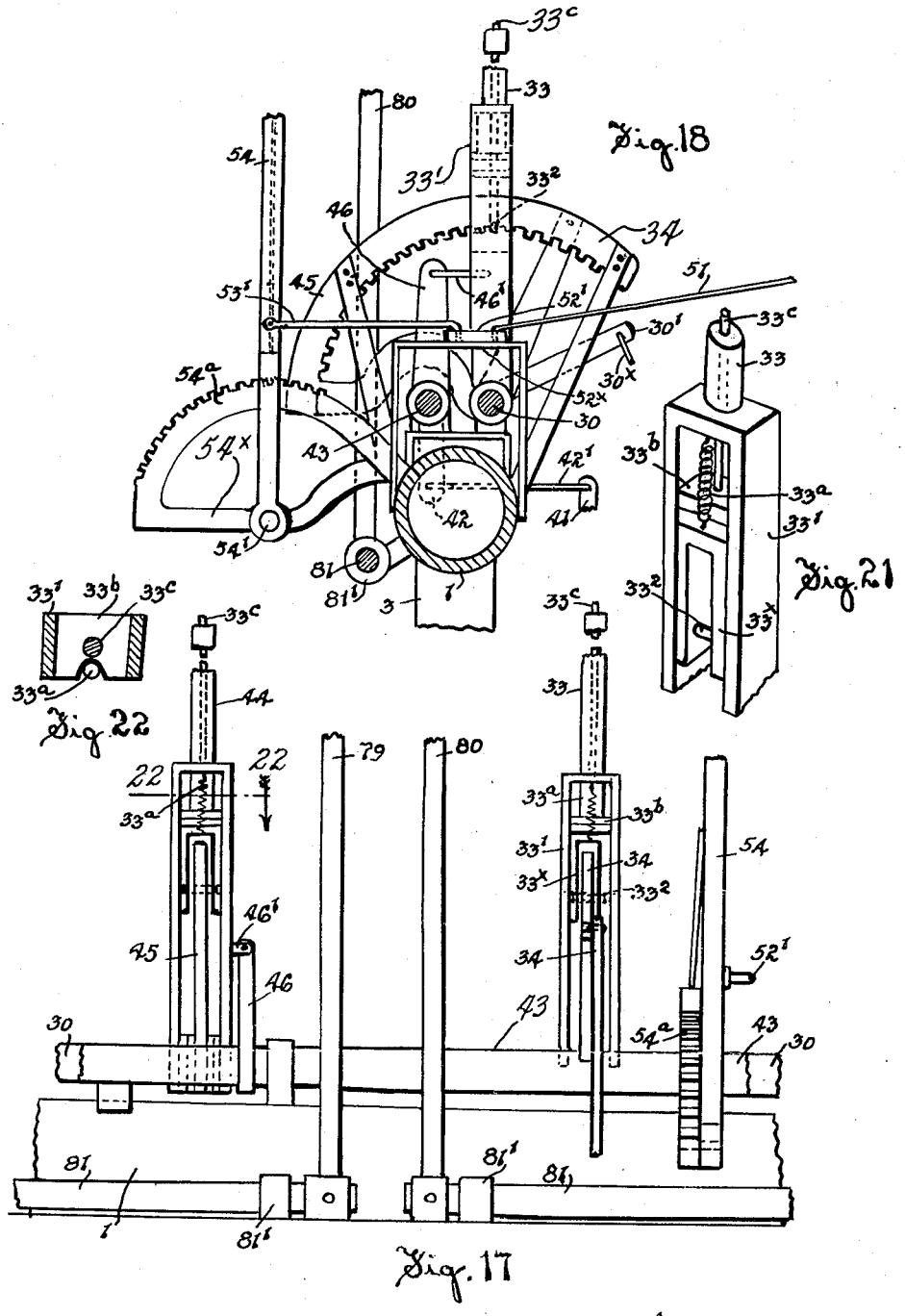

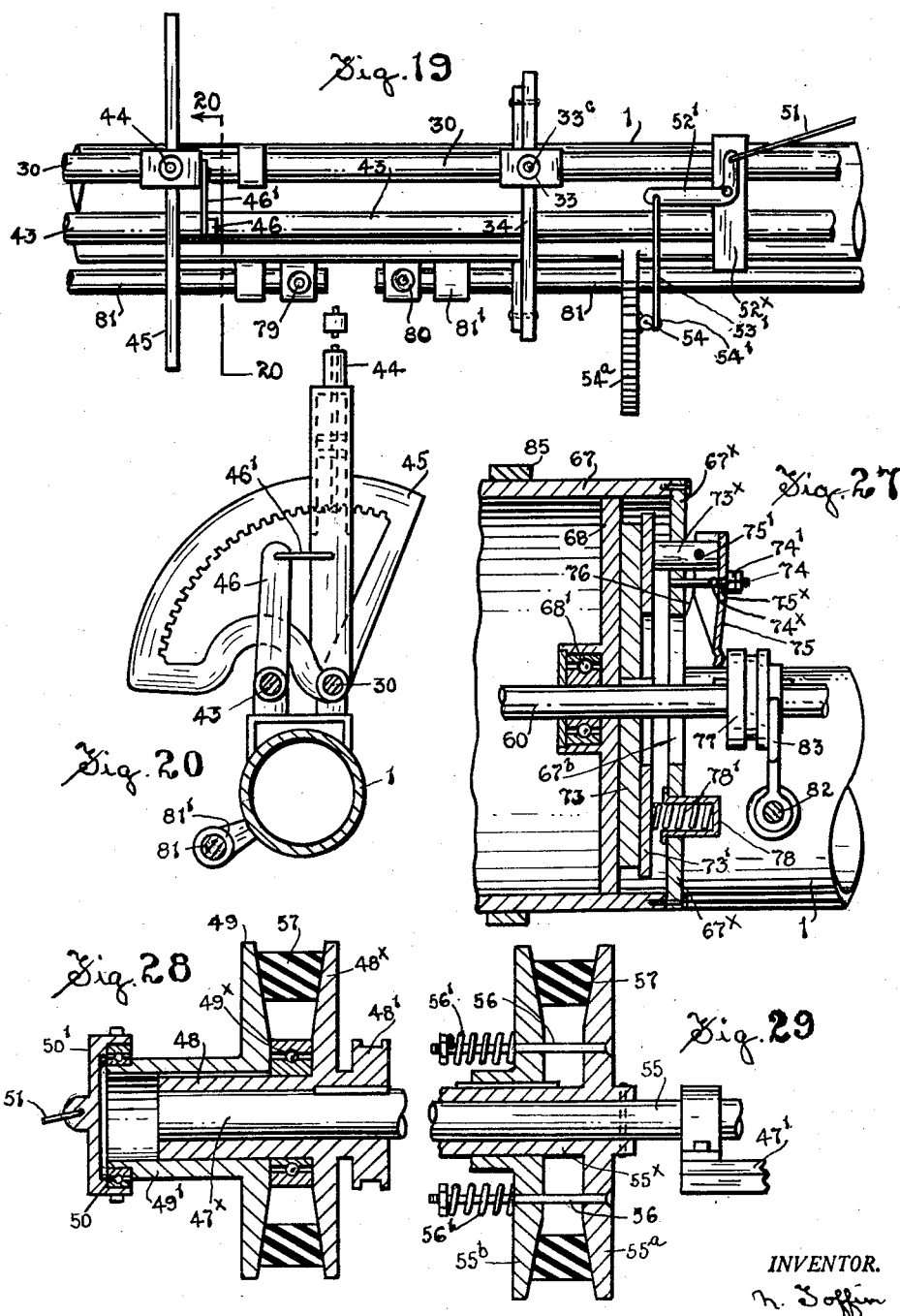

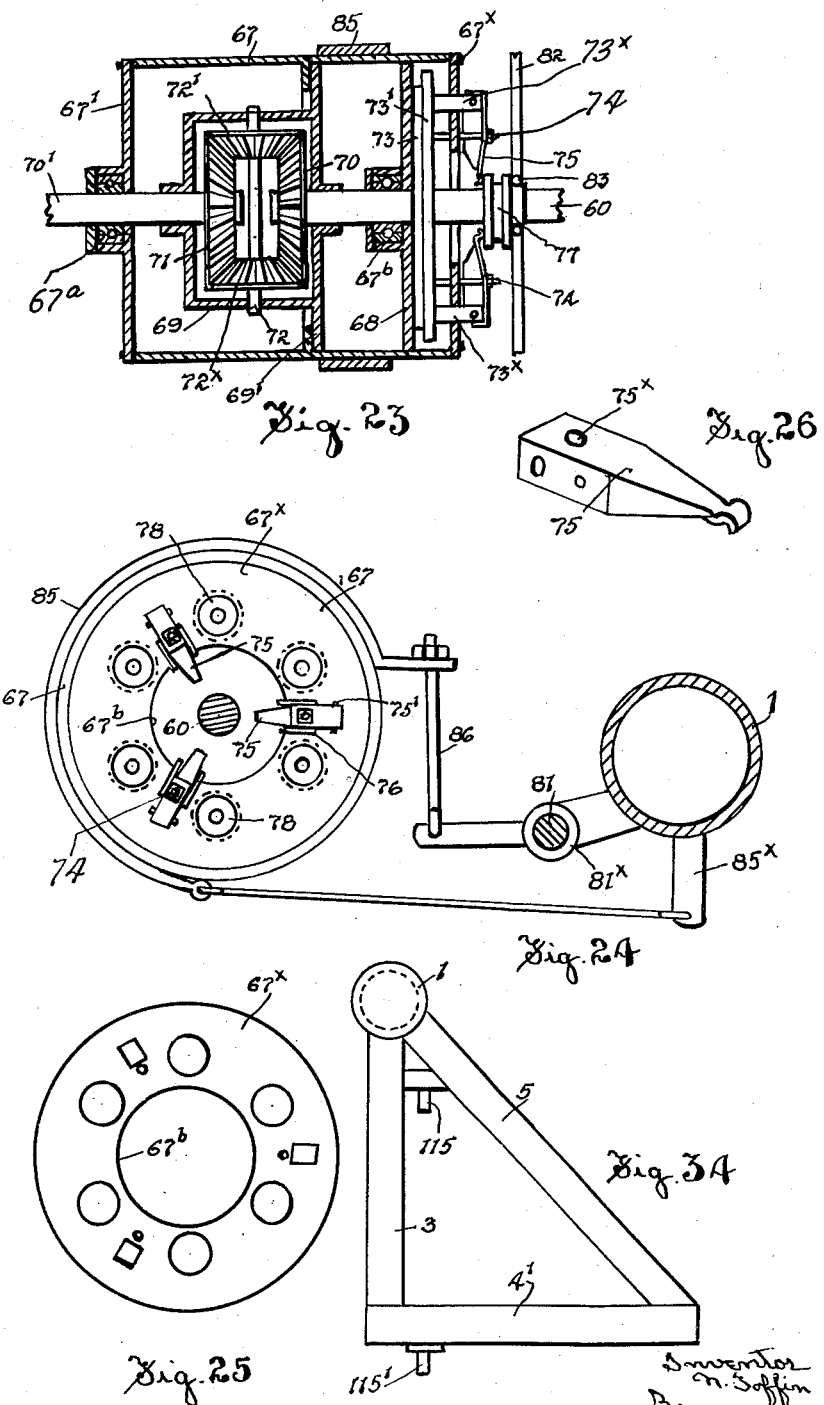

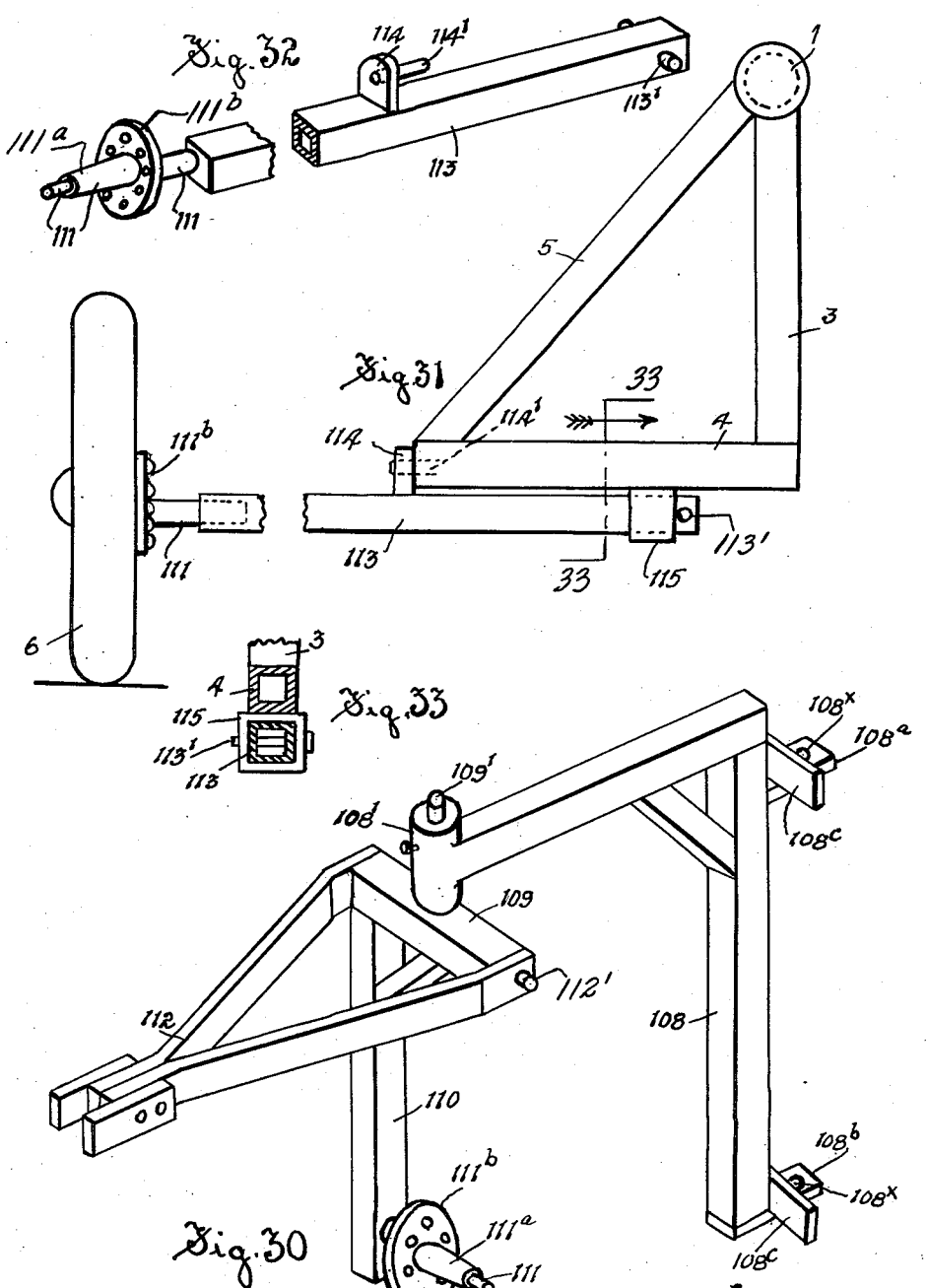

United States Patent Office 2,906,078
Patented Sept. 29, 1959

2,906,078

SWATHING MACHINE

Nicholas Toffin, Winnipeg, Manitoba, Canada

Application September 2, 1954, Serial No. 453,910

4 Claims. (Cl. 56—23)

The invention relates to a machine for cutting standing field grain and leaving the grain lying in a swath as the machine advances over the field and an object of the invention is to provide a machine supported by driven ground wheels and a rear caster wheel and provided with forward, driven cutting blades and associated cutter bar and with similar, transverse and spaced, inwardly delivering, endless conveyors whereby all grain cut by the blades is discharged through the area reserved between the inner ends of the conveyors and onto the ground or field, in swath formation as the machine advances.

A further object is to provide means whereby the conveyors and associated cutting blades and cutter bar can be adjusted as a unit, as desired, and in relation to the crop to be cut, and further to provide means for counterbalancing the dead load of the unit embodying the conveyors, cutting blades and cutter bar.

A further object is to provide a driven reel overlying the cutter blades and adjustable towards and away from the blades.

A further object is to provide a prime mover, such as a gas engine, for driving the cutter blades, the reel and the ground wheels and wherein the several engine driven connections are selectively controlled by manually actuated control levers assembled adjacent to and within convenient range of an elevated driver's seat mounted on the machine frame.

A further object is to so arrange the drive for the ground wheels that either wheel can be selectively driven or freed as desired and also to provide means for varying, at will, the driven speed of the ground wheels.

A further object is to provide a construction which permits the trailing caster wheel to be adjusted in position so that it can be set and maintained in an upright position in relation to the ground, irrespective of any sagging or other such irregularity occuring in the main frame to which it is attached.

A further object is to provide attachments for connecting to the machine and which when properly placed and connected and supplied with the existing, demounted, ground wheels of the machine, permit the relatively wide machine to be hauled sideways, as by a tractor, hitched to one of the attachments.

A further object is to provide similar, right and left hand, clutch and brake controlled transmission casings selectively controlling the driving of the ground wheels, and wherein the operating power transmitted to the casings is directly under the control of the machine operator.

With the above more important and other objects in view which will become more apparent as the description proceeds, the invention consists essentially in the arrangement and construction of parts hereinafter described, reference being had to the accompanying drawings in which:

Fig. 3 is an enlarged view of the parts appearing in Fig. 1.

Fig. 4 is an enlarged vertical sectional view at 4—4 Fig. 3.

Fig. 5 is an enlarged rear view of the parts appearing in Fig. 2.

Fig. 6 is an end view of certain of the parts shown in Fig. 5 and particularly to show the relative positions of the several pulleys.

Fig. 7 is an enlarged end view of the machine, certain parts having been omitted for clearness.

Fig. 8 is an enlarged vertical sectional view at 8—8 Fig. 3 and looking to the left.

Fig. 9 is an enlarged detailed plan view showing part of one of the conveyors and the associated cutter bar and blades and other related parts.

Fig. 10 is an enlarged, detailed, vertical sectional view at 10—10 Fig. 9.

Fig. 11 is an enlarged, detailed, vertical sectional view at 11—11 Fig. 9.

Fig. 12 is an enlarged vertical sectional view taken in the same vertical plane as that indicated at 10—10, Fig. 9 and cutting through the angle bar which connects the sway bars and showing the mounting for the oscillating bar which shifts the cutter bar.

Fig. 13 is an enlarged face view of the sliding mounting for the latter oscillating bar.

Fig. 14 is an enlarged, vertical, sectional view taken in the same vertical plane as that indicated at 11—11 Fig. 9 and cutting through the angle bar which connects the sway bars and showing also the mounting for one of the driving stub shafts of one of the conveyors.

Fig. 15 is an enlarged detailed plan view of a portion of the fork for the rear caster wheel and showing the adjusting plates associated therewith.

Fig. 16 is a rear face view of the latter plates and showing the adjusting bolts and slots and the bearing for the fork.

Fig. 17 is an enlarged rear view of the several, hand actuated, control levers and showing their grouping and other adjacent parts.

Fig. 18 is an end view of the parts shown in Fig. 17 and parts being shown in section.

Fig. 19 is a plan view of the hand actuated control levers and adjacent parts.

Fig. 20 is an enlarged vertical sectional view at 20—20 Fig. 19 and looking towards the left.

Fig. 21 is an enlarged perspective view showing the fork associated with one of the hand levers and the parts contained within the fork.

Fig. 22 is an enlarged horizontal sectional view at 22—22 Fig. 17.

Fig. 23 is an enlarged horizontal sectional view centrally through one of the casings, certain parts appearing in plan view.

Fig. 24 is a view of the right hand end of the latter casing, the collar having been removed and showing also the brake band and its connections and parts being shown in section.

Fig. 25 is face view of the removed closure plate appearing at the right hand end of the casing shown in Fig. 23.

Fig. 26 is an enlarged, perspective view of one of the pivoted fingers associated with the transmission casing.

Fig. 27 is an enlarged sectional view of the parts shown at the right hand end of the transmission casing in Fig. 23.

Fig. 28 is an enlarged vertical sectional view centrally through the coned discs associated with the engine shaft.

Fig. 29 is an enlarged vertical sectional view centrally through the coned discs associated with the counter shaft which is directly driven by the engine shaft.

Fig. 30 is a perspective view of one of the attachments provided for transportation purposes.

Fig. 31 is a side view of the other attachment provided for transportation purposes and showing it attached to the machine.

Fig. 32 is a perspective view of the latter attachment, part having been broken away and parts being shown in section.

Fig. 33 is a vertical sectional view at 33—33 Fig. 31 and looking in the direction of the applied arrow.

Fig. 34 is a view showing the location of the pivot pins which enter the lugs of the attachment shown in Fig. 30.

In the drawings like characters of reference indicate corresponding parts in the several figures.

Figure 1:
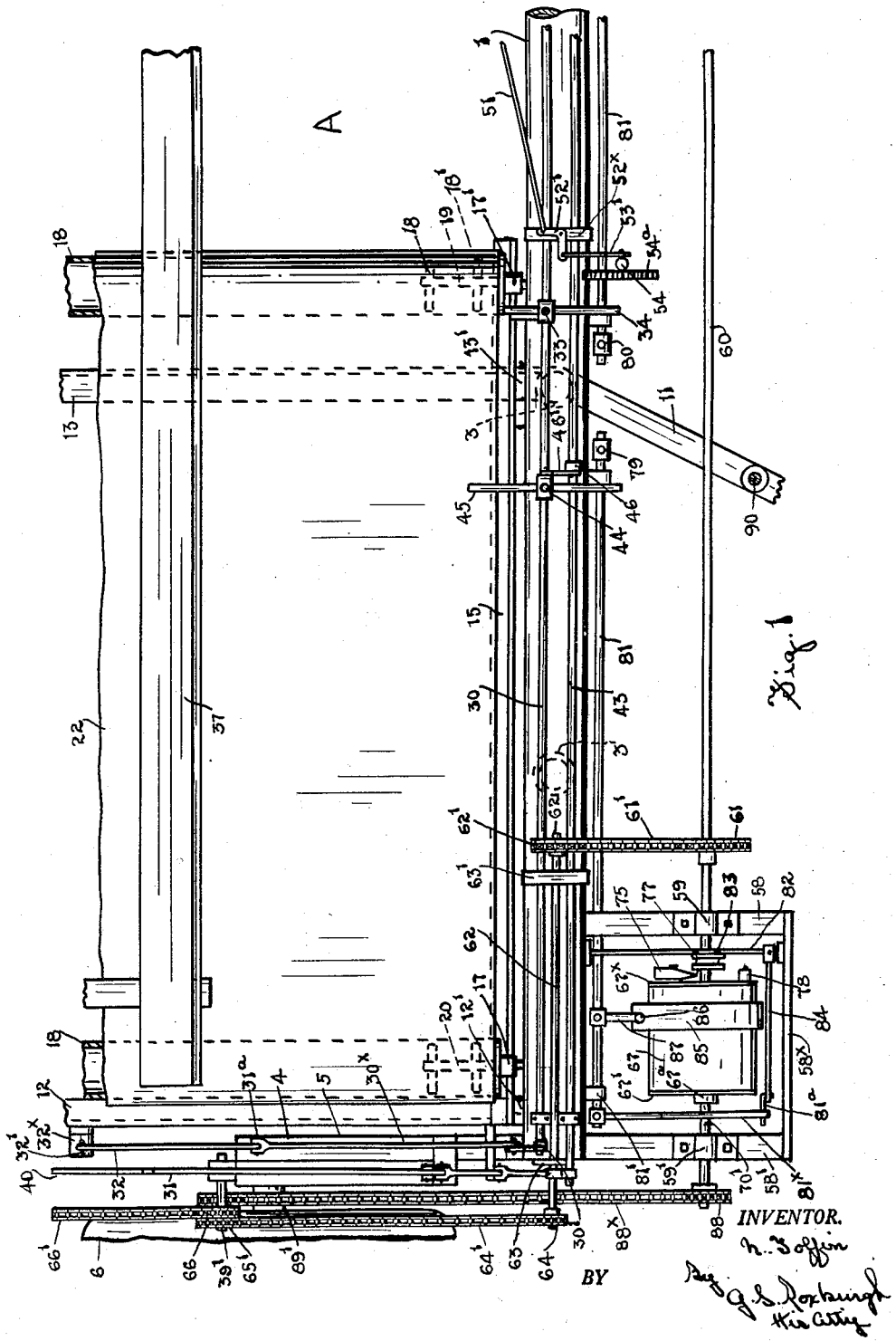
Fig. 1 is a plan view of the left hand end of the machine, the fore part having been removed.

The main frame of the machine embodies a main, elevated beam 1 which is tubular, a pair of aligned but spaced underlying beams 2 and 2', spaced posts or uprights 3 between the beams and supporting the upper beam from the lower beams, a pair of equal length parallel, side beams 4 and 4' extending forwardly from the outer ends of the under beams to which they are permanently secured, similar, angular brace bars 5 extending between the beam 1 and the forward ends of the side beams, a forward pair of similar ground wheels 6 normally mounted on suitable, transversely aligned axles 6' secured permanently to and extending outwardly from the side beams and a rearwardly disposed caster wheel 7. This rigid frame supports parts hereinafter described in detail.

The wheels 6 are controlled so that they can each remain free of drive or be independently driven in a forward or reverse direction as desired to direct the machine over the field and the caster wheel serves to support the rear end of the machine and swivel as required.

The caster wheel is rotatably mounted in a fork 8, the head of which is supplied with a pivot pin 8' rotatably received in a bearing 8$^x$ carried by a plate 8$^2$. The plate 8$^2$ is supplied with a number of similar, concentrically arranged, adjusting bolts 9 which pass through arcuate receiving slots 10' in the said plate and which adjustably secure the said plate to a second plate 10 permanently secured to the converging ends of bars 11 and 11' extending rearwardly from selected posts 3 and suitably braced by brace bar 11$^x$ extending angularly downwardly from the meeting ends of the bars to the under beam 2. One can cant the caster wheel as desired by manipulating the bolts 9 in the adjusting slots.

In the area between the side beams, I locate two similar, transversely disposed, endless conveyors or aprons, both driven to deliver material disposed thereon into an open area A reserved between the inner ends of the conveyors and which open area is directly in advance of the open space A' reserved between the inner ends of the under frame beams 2 and 2', such arrangement permitting the material discharged from the conveyors to gravitate to the ground and clear the machine as it advances.

The conveyors and their associated parts are identical. Each conveyor is supported by a pair of forwardly extending, spaced, sway bars 12 and 13 having their rear ends pivotally connected at 12' and 13' to the rear lower beams 2 and 2' of the main frame and said pairs of sway bars both extend forwardly beyond the side beams and have their forward ends all interconnected together by a forward angle bar 14 so that the said parts can be raised or lowered as a unit structure. Similar angle bars 15 interconnect the rear ends of each pair of sway bars, being placed immediately in advance of their pivotal points. The forward angle bar 14 has a second angle bar 14' secured thereto (see Figs. 10 and 11) and to this latter bar the usual guards 14$^x$ are secured and which carry the usual endwise shiftable cutter bar 16 provided with the well known grain cutter blades 16'. The bar and blades extend virtually the full width of the fore part of the machine and are reinforced by parts shortly described.

The angle bars 14' and 15 support forward and rearward roller bearings 17 and 17' in which the shafts of the pairs of spaced rollers for the endless conveyors are mounted. The rollers 18 are all tubular and are all supplied internally with fixed spiders 18' and the forward ends of all rollers and the rear ends of the inner rollers are all supplied with stub shafts 19 received rotatably in the bearings 17 and 17' and secured permanently to the spiders. The rear ends of the outer rollers are supplied with stub shafts 20 and 21 respectively, which are permanently secured to their spiders and are received in the bearings 17' through which they pass to provide drive shafts for the outer rollers. The pairs of inner and outer rollers are supplied with endless conveyors 22 and 23 and it is obvious that if the shafts 20 and 21 be driven in the proper directions the conveyors will both deliver material to the open space between their inner ends and that standing grain cut by the driven knives, under the influence of the reel later referred to, fall rearwardly, the cut central grain falling directly onto the ground through the reserved open space between the inner rollers and other cut grain falling onto the conveyors and being discharged onto the ground from their inner ends. The combined result is that cut grain is left lying in a swath on the field as the machine advances.

Means is supplied for reciprocating the cutter bar as now described. At the right hand end of the machine, I supply a fixed bar 24 (see Figs. 9 and 12) which has its front and rear ends permanently secured to the bars 14 and 15 and positioned to pass between the stretches of the conveyor 23 and to this bar I pivotally secure at 25' an oscillating bar 25, the forward end of which is contracted to underlie a keeper plate 25$^x$ supported by short spacers and secured to the cutter bar through the spacers. The rear end of the sway bar has a pair of wear plates 26 permanently secured thereto (see Figs. 10 and 13) and these plates are slidably received between suitably spaced guide bars 27 and 27', the lower guide bar being in the form of a short angle bar secured to the vertical flange of the angle bar 15. Rearwardly beyond the guide bars, the sway bar is supplied with an upstanding ball 28 to be received within a socket formed at the end of a pitman 29 which is reciprocated as shortly described.

Means is provided for raising or lowering the interconnected sway bars 12 and 13 in order to adjust the position of the cutter blades in respect to the ground and such is now described in detail. On the elevated beam 1, I mount rotatably a shaft 30 which extends the full length of such beam and has its ends supplied with similar cranks 31'. Each crank has a lifting rod 30$^x$ secured thereto and the lower end of the rod is connected adjustably and pivotally at 30$a$ to a lever 31 which in turn is pivotally secured at 31' to the lower end of the adjacent brace bar 5. The fixed end of each lever 31 has a forward extension bar 32 permanently secured thereto and such is connected by a suitable length of chain 32' to an angle bracket 32$^x$ fixedly secured to the adjacent outer sway bar 12. The shaft 30 is supplied with an actuating hand lever 33 operating over a quadrant 34 permanently secured to the beam 1. The lever and quadrant are of novel construction and in regard to such reference is made particularly to Figs. 17, 18, 19 and 21 of the drawings. The lever 33 is tubular and has its lower end secured to a fork 33' slidably containing a spanner 33$^x$ which is fitted with a catch pin 33$^2$ and is held normally in an up position by an attached spring 33$^a$. Above the spanner is a fixed cross web 33$^b$ carried by the fork and an actuating rod 33$^c$ passes downwardly through the tubular lever and through the web and is permanently secured to the head of the spanner. The upper end of the rod projects beyond the upper end of the lever to supply a finger piece which can be down pressed to actuate the spanner. The quadrant 34 passes freely through the spanner above the pin 33$^2$ and has its underside supplied with a row of teeth 34' arranged concentric to the shaft 30 and normally engaged by the pin. Obviously by down pressing the rod one can quickly release the pin from the teeth and then actuate the lever as desired and lock it in the desired position by releasing the pressure on the rod. As before stated the lever controls the position of the cutter blades of the machine as will be readily apparent from the structural arrangement of the various parts previously described.

In order to counter balance the dead load of the sway bars and parts carried thereby, I have secured relatively strong springs 35 (see Fig. 7) to the free ends of the levers 31, said springs having their upper ends each connected to a fixed arm 36 secured to each brace 5 and extending forwardly and upwardly therefrom, such arms being also supplied to support the reel 37.

The arms 36 are outwardly offset from the braces 5 being supported by the outer ends of the short plates 38 which have their inner ends secured to the brace bars. The forward end of each arm 36 has a pair of upstanding lugs 39 (see Figs. 7 and 8) secured thereto and which support rotatably a stub shaft 39' and the stub shafts, which are transversely aligned, pivotally support opposing, reel adjusting arms 40, the forward ends of which are supplied with suitable bearings to receive rotatably the central shaft 37' of the reel 37. The reel overlies the cutting knives, as is usual, and is adjustable towards and away from the same, the adjustment being accomplished by parts now described.

On each brace bar 5 I mount pivotally a bell crank 41 having a long and short arm, the long arm thereof being connected in each instance by a link 41' to the overlying end of the adjacent arm 40 and the short end thereof being connected by a rod 42' to a short crank 42 secured to the end of the shaft 43 lying to the rear of and parallel to the shaft 30 and rotatably carried in suitable bearings mounted on the beam 1. The shaft 43 is controlled by a hand lever 44 which embodies the same parts as the lever 33 and has the lower end of the fork thereof mounted on the shaft 30 and the catch pin thereof engageable with the teeth of a quadrant 45 permanently secured to the shaft 30, the arrangement being such that the depression of the catch pin by the push rod of said lever 44 disengages the pin from its quadrant 45. The shaft 43 is supplied with an upstanding crank 46 connected by a link 46' to the fork of the lever 44 with the result that when the lever 44 is shifted the shaft 43 is rotated and the reel is raised or lowered as desired.

The reel, the ground wheels, the conveyors and the cutter bar all have to be driven and to this end the following parts are supplied.

Figure 2:
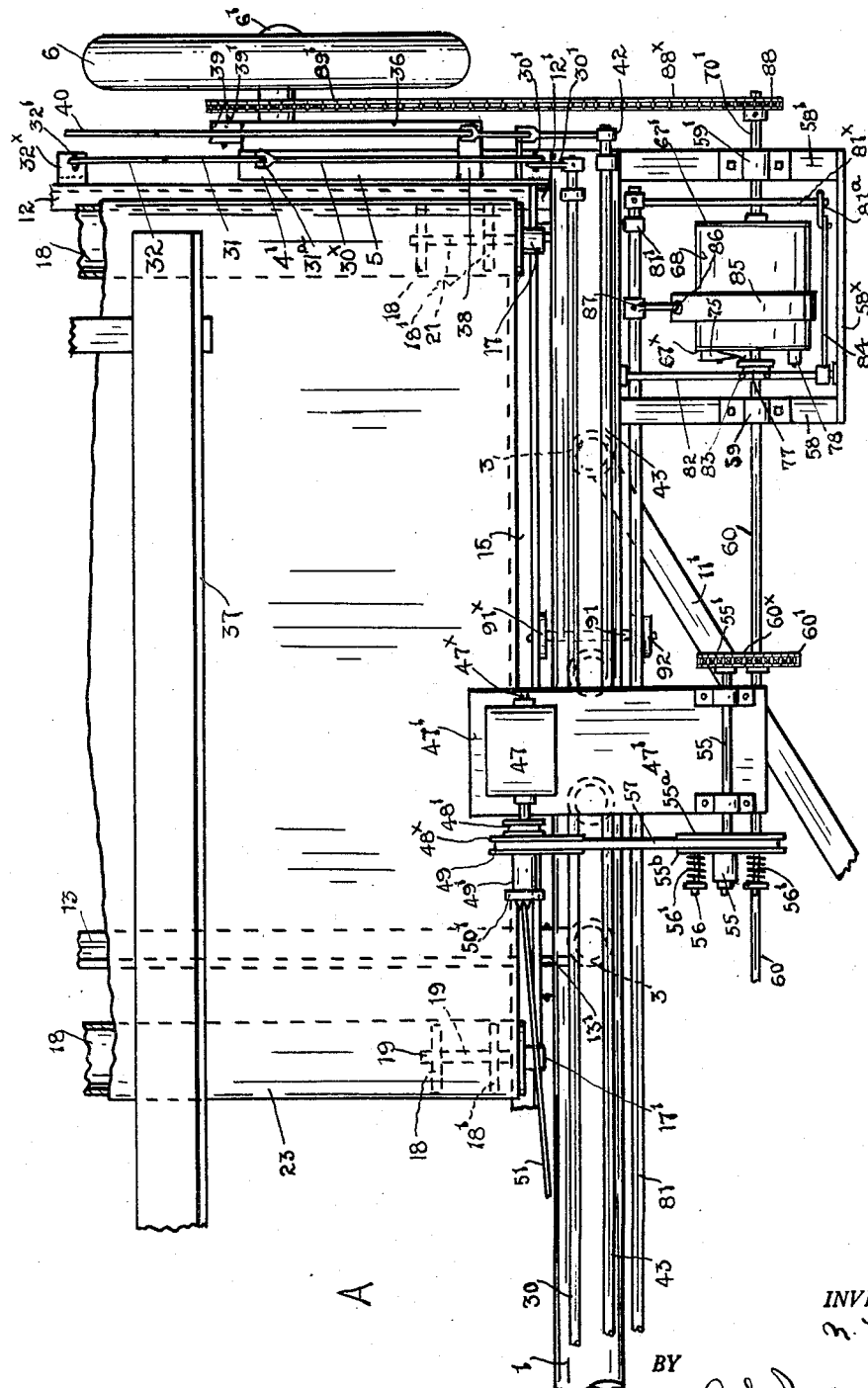
Fig. 2 is a plan view of the right hand end of the machine, the fore part having been removed.

On the beam 1, I mount a suitable, elevated platform 47' which supports a prime mover such as an internal combustion engine 47, the drive shaft of which is indicated at 47ˣ (see Figs. 2 and 5). The drive shaft has an inner sleeve 48 secured thereto (see Fig. 28) and the sleeve carries a drive pulley 48' and a coned disc 48ˣ. Opposing the disc 48ˣ is a second, similar, coned disc 49 formed at the inner end of an outer sleeve 49' which is feathered on the inner sleeve to rotate therewith but is free to shift endwise thereon. A roller bearing 49ˣ is rotatably mounted on the inner sleeve and normally spaces the discs. The outer end of the sleeve has a roller bearing 50 shrunk thereon and the outer raceway of the bearing has a cap plate 50' secured thereto to which I have connected a rod 51 which passes inwardly of the machine and is connected to a horizontally disposed bell crank 52' pivotally mounted on a U-shaped bracket 52ˣ (see Figs. 1 and 19). The down going legs of the bracket span the shafts 43 and 33 and are permanently secured to the beam 1. A second rod 53' connects the bell crank 52' with a hand lever 54 pivoted at 54' (see Figs. 17, 18 and 19) to the bar 54ˣ of a quadrant 54ᵃ secured to and extending rearwardly from the beam 1. The lever 54 is supplied with the usual hand latch and detent and obviously one can set the disc 49 in any desired position towards or away from the disc 48ˣ by manipulating the lever.

Rearwardly of the engine shaft and parallel thereto, and on the platform I mount a counter shaft 55 one end of which is provided with a chain wheel 55' and the other end of which has a sleeve 55ˣ secured thereto (see Fig. 29), the sleeve being integrally formed with a coned disc 55ᵃ. On the sleeve I feather a second coned disc 55ᵇ and the disc 55ᵃ is supplied with a number of fixed rods 56 which pass slidably through the disc 55ᵇ and are supplied beyond the disc with compression springs 56' acting to push the disc 55ᵇ towards that 55ᵃ. An endless V-belt 57 is supplied to connect the pairs of coned discs on the engine shaft and the counter shaft and it will be obvious that the speed at which the counter shaft is driven depends on the position in which the disc 49 is held by the setting of the lever 54. The arrangement also permits of the continuous driving of the engine shaft without driving the counter shaft for the reason that if the disc 49 is moved sufficiently far away from its opposing disc, the belt will drop onto the roller 49ˣ and will not accordingly be driven.

At its opposite ends, the main beam 1 has a pair of spaced, horizontally disposed, rearwardly extending, inner and outer, parallel bars 58 and 58' permanently secured thereto and the rear ends of each pair of bars are interconnected by a rear bar 58ˣ. The bars 58 and 58' are supplied with opposing inner and outer bearings 59 and 59¹ and the inner bearings support rotatably a relatively long rear shaft 60 which is supplied with a chain wheel 60' connected by an endless chain 60ˣ to the chain wheel 55' of the counter shaft 55. A second chain wheel is secured to the latter shaft and it, indicated at 61, is supplied with an endless chain 61' which drives a further chain wheel 62' secured to the inner end of the reel driving shaft 62, the latter being suitably supported in bearings supplied at the upper ends of upstanding legs 63 and 63' extending upwardly from and secured to the beam 1. The outer end of the shaft 62 is provided with a chain wheel 64 (see Figs. 1 and 3) which is connected by an endless chain 64' to a chain wheel 65' mounted on the adjacent stub shaft 39' and formed integral with a second chain wheel 66 supplied with a further endless chain 66' utilized to drive a chain wheel 66ˣ secured to the adjacent end of the reel shaft (see Fig. 7).

The shaft 60 has its opposite ends terminating within similar right and left transmission casings 67 and 68 and as they are both identical in construction the description of one will suffice, and in such description reference is made more particularly to Figs. 23 to 26 of the drawings.

The casing 67 is cylindrical and has its ends permanently closed by end plates 67' and 67ˣ, the plate 67' being supplied with a central end bearing 67ᵃ and the plate 67ˣ having an open centre 67ᵇ to admit the entering end of the shaft 60 which is rotatably received in a bearing 68' carried by a fixed disc 68 within and secured to the casing. A gear box 69 is located within the casing, being carried by a second disc 69' secured to the casing and within the gear box are opposing, spaced, bevel gears 70 and 71, one secured to the entered end of the shaft 60 and the other secured to the inner end of an outgoing shaft 70' aligned with shaft 60 and rotatable in the bearing 67ᵃ and the outer bearing 59' hereinbefore mentioned. A spindle 72 crosses the casing, centrally between the gears and is supplied with similar bevel pinions 72' and 72ˣ meshed with the gears.

At the inner end of each casing I have supplied a clutch, the details of which are now described.

On the shaft 60 I spline a friction disc 73 and opposing this I mount an annular, shiftable, pressure plate 73' which carries a number of similar concentrically arranged, fixed studs 73ˣ which pass slidably through receiving openings in the end plate 67ˣ. The end plate 67ˣ has a number of outstanding bolts 74 permanently secured thereto immediately to the inner sides of the projecting ends of the studs 73ˣ and the bolts are each supplied with a pivot pin 74ˣ and an adjacent retaining nut 74'. Similar, radially disposed, pressure fingers 75 of the shape best shown in Fig. 26, are provided and these have their outer ends pivotally secured to the projecting ends of the studs 73ˣ by pins 75' carried by their side flanges and have their body portions supplied each with a hole 75ˣ through which the bolt 74 passes, the body of the finger being rockable on the pin 74ˣ and retained by the nut 74'. A spring 76 is associated with each finger, functioning to hold the finger normally engaged with the nut 74'. The inner ends of the fingers are grouped around but clear of the shaft 60 and are designed to be engaged by a collar 77 slidably mounted on the shaft. The plate 67ˣ carries a number of fixed thimbles or cups 78 receiving similar coiled springs 78' which project from the cups and engage the adjacent face of the pressure plate 73'.

Similar hand actuated levers 79 and 80 are provided for end shifting the collars 77 on the shaft 60 and as the connections between the levers and collars are the same in both instances the description of the one arrangement will suffice.

Each lever 79 or 80 is secured to one end of a shaft 81 which is carried in suitable bearings 81' provided rearwardly on the beam 1 and the other end of the shaft is provided with a crank 81ˣ which extends rearwardly to the inner side of the outer bar 58'. The beam 1 and the rear bar 58ˣ provide bearings for a cross shaft 82 situated directly below the shiftable collar 77 and such shaft is supplied centrally with a forked lever 83 which spans the collar and is adapted to shift the same on the shaft 60 in the rotation of the shaft 82. The shaft 82 has a lever 84 secured thereto and it extends towards the free end of the crank 81ˣ to which it is connected by a link 81ª, the whole arrangement being such that the manipulation of the lever 79 or that 80, as the case may be, actuates the collar on the shaft to engage or disengage the clutch.

Associated with each transmission casing I provide a brake band 85 (see Figs. 23 and 24) which band passes partially around the said casing and has the under end connected by a rod 85' to a fixed arm 85ˣ extending from the underside of the beam 1. The other end of the band is connected by a link 86 to a crank 87 secured to the shaft 81, the arrangement being such that in the manipulation of the lever 79 or that 80, the band can be caused to hold the casing against rotation or free the same to rotate.

The shafts 70' hereinbefore mentioned, have their outer ends supplied with chain wheels 88 which are connected by similar endless chains 88ˣ to chain wheels 89' associated with the ground wheels 6 for driving the latter.

The bar 11 has an upstanding post 90 secured thereto which carries a seat 90' for the machine operator and the various control levers are all situated in advance of the seat and within convenient range of the operator.

The endless conveyors are driven and the bar 25 is oscillated in the manner now described. The pulley 48' on the engine shaft is connected by an endless belt 91' to a pulley 91ˣ secured to the forward end of a short shaft 91 mounted on one of the posts 3, suitable idler rollers, 92 and 92' carried by another post, being supplied to guide the belt (see Figs. 5 and 6). The rear end of the shaft 91 is supplied with a pulley 93' connected by a belt 93ˣ to a pulley 94' secured to a stub shaft 94 secured to another of the posts 3. A second pulley 95 rotatable with pulley 94', is mounted on the latter stub shaft and it is connected to the pitman ball 28 already referred to.

The outer, rear stub shafts 20 and 21 of the conveyors are supplied with similar pulleys 96 and 96' and the beam 1 is provided with a stub shaft 97 carrying a pair of pulleys 97' and 97ˣ. An endless belt 98 passes around the pulleys 97', 95 and 96', a suitable belt tightener 99 being supplied to hold the belt taut as is common practice.

The main beam 1 has a second stub shaft 100 extending rearwardly therefrom (see Fig. 3) and it carries two similar pulleys 101', the inner one of which is connected by a driving belt 101 to the pulley 97ˣ. The outer pulley on the stub shaft 100 drives an endless crossed belt 103 which passes around the pulley 96 and a further pulley 104 which is specially mounted as now described reference being made particularly to Figs. 3 and 4 of the drawings. A horizontally disposed angle bar 105 is fixedly secured to the upper ends of a pair of posts 106 extending upwardly from the beam 2 and the angle bar has its vertical flange longitudinally slotted at 105' to receive a stub shaft 107 supplied with a collar 107' and a nut 107ˣ which permit the stub shaft to be shifted in position in the slot. The pulley 104 is rotatably mounted on the stub shaft and can accordingly be shifted to tighten or loosen the belt 103 as required.

From the above it will be seen that the engine pulley 48' is utilized through the various above connections provided, to operate the conveyors, and to actuate the bar 25 to drive the cutting knives.

In order that the machine, which is relatively wide, may be conveniently transported from place to place, I have supplied certain attachments which allow the machine to be hauled from place to place, end on. These are two attachments which are shown in Figs. 30 to 33 inclusive of the drawings, one as appearing in Fig. 30, to be secured to the right hand end of the machine, which end becomes the forward end of the machine when being hauled, and the other, as shown in Figs. 31, 32 and 33 being secured to the left hand end of the machine which becomes the rear end of the hauled machine.

The attachment appearing in Fig. 30 presents a suitably reinforced goose neck 108 having a forward bearing 108' and a pair of upper and lower sturdy lugs 108ª and 108ᵇ extending rearwardly therefrom, there being horizontal stop plates 108ᶜ associated with the lugs and the lugs being provided with vertically aligned holes 108ˣ. A cross head 109 underlies the bearing 108' and is provided with a pivot pin 109' rotatably received in the bearing. The cross head has a suitably reinforced, vertical leg 110 permanently secured thereto and the lower end of the leg is provided with a fixed spindle 111 mounting a sleeve 111ª and a circular plate 111ᵇ integrally formed with the sleeve. A hitch, generally indicated by the reference numeral 112 is pivotally secured at 112' to the end of the cross head.

The attachment appearing in Figs. 30, 31 and 32 is in the form of a long, hollow beam 113 which has one end provided with a removable stop pin 113' and the other end supplied with a spindle 111, a sleeve 111ª and a plate 111ᵇ similar to those above described. Somewhat back from the pin 113' the beam has an upstanding, fixed lug 114 which carries a horizontal pin 114' pointing towards the cross pin 113'.

When it is desired to haul my machine from place to place, the attachment shown in Fig. 30 is secured to the triangular, shaped right hand end of the machine main frame which is supplied with vertically aligned, upper and lower pins 115 and 115' (see Fig. 34) which are positioned and spaced to enter the holes 108ˣ above mentioned and with the stop plates 108ᶜ engageable with the frame members to prevent lateral swing of the goose neck. Prior to placing the said attachment, the said end of the machine will be jacked up and held up to permit of the removal of the wheel 6 which will then be mounted on the sleeve 111ª shown in Fig. 30 and secured in the usual way by bolting to the associated plate 111ᵇ. This having been done the attachment is put in position and the jack is removed with the result that the displaced wheel 6 supports that end of the machine.

One then takes the jack to the other side of the machine and raises and supports it and removes the other ground wheel 6 and applies such wheel on the spindle of the other attachment and fastens it to the adjacent plate. The beam 113 is then placed lengthwise under the horizontal side beam 4 which is supplied with a fixed sleeve 115 to receive it and with a forward hole 116 bored therein to receive the pin 114'. Once the parts are so placed, the pin 113' is put in place to prevent end shifting of the beam 113 and at such time the other wheel 6 is in a location just nicely clear of the cutting knives, the length of the beam 113 permitting of such placement.

When the attachments have been so applied, the machine is supported by the two wheels of the attachments and by the caster wheel and can then be hauled end on by connecting the hitch to the well known draw bar of a tractor.

What I claim as my invention is:

1. In a swathing machine, a rigid main frame presenting a rear, transversely positioned, upstanding part and having a central passage reserved, centrally, in the lower portion thereof and side beams extending forwardly and horizontally from the ends of the said lower portion and in combination with said frame, driven ground wheels supporting the forward ends of the side beams, a caster wheel supporting the frame rearwardly, and offset to the side of said passage, inner and outer pairs of sway bars positioned between the side beams and having their rear ends horizontally pivoted to the frame and their forward ends rigidly interconnected by a cross bar, there being a space reserved between the inner bars of the pair of sway bars, said space being in advance of the passage aforesaid, a driven, transversely positioned conveyor carried by each pair of sway bars to deliver material to said space, grain cutting means in advance of the conveyors and carried by the cross bar and means supported by the main frame for adjustably raising or lowering the outer sway bars.

2. The device as claimed in claim 1 wherein a reel is suspended from the main frame in a location overlying the grain cutting means and said reel is adjustable towards or away from said cutting means.

3. The device as claimed in claim 1 wherein the driving of either ground wheel is selectively controlled in forward or reverse direction for machine travel or directional purposes.

4. The device as claimed in claim 1 wherein the driving of either ground wheel is selectively controlled in forward or reverse direction for machine travel or directional purposes and wherein means is supplied to vary the speed at which either wheel is driven in either forward or reverse direction.

References Cited in the file of this patent

UNITED STATES PATENTS

| | | |
|---|---|---|
| 2,281,059 | Anderson et al. | Apr. 28, 1942 |
| 2,352,593 | Allin | July 4, 1944 |
| 2,520,835 | England | Aug. 29, 1950 |
| 2,631,421 | Pierce | Mar. 17, 1953 |
| 2,674,082 | Ryden | Apr. 6, 1954 |
| 2,677,225 | Ommodt | May 4, 1954 |